A. ITEN.
WEED BURNER.
APPLICATION FILED DEC. 9, 1907.
899,404.
Patented Sept. 22, 1908.
3 SHEETS—SHEET 1.
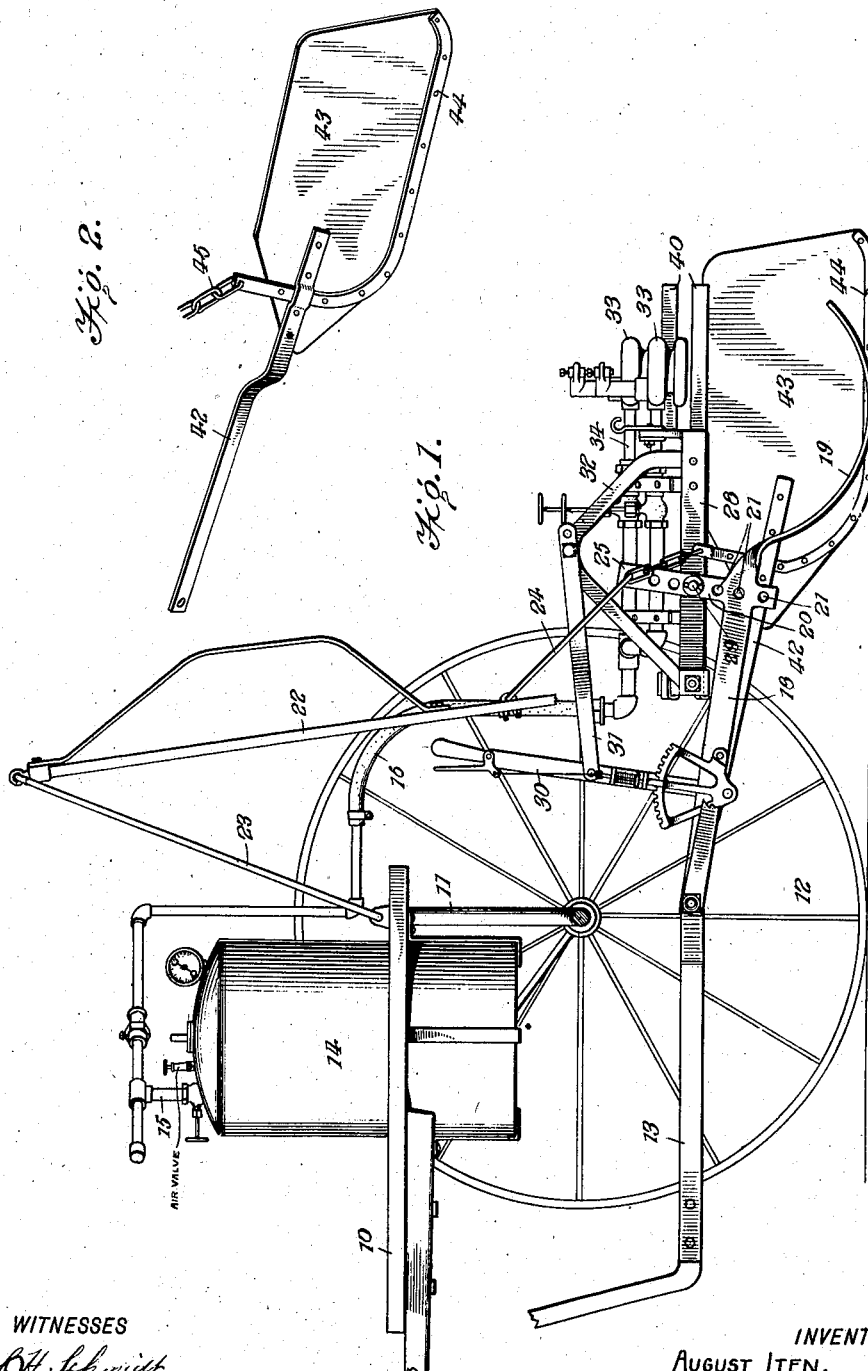
WITNESSES
INVENTOR
August Iten,
BY
ATTORNEYS A. ITEN.
WEED BURNER.
APPLICATION FILED DEC. 9, 1907.
899,404.
Patented Sept. 22, 1908.
3 SHEETS—SHEET 2.
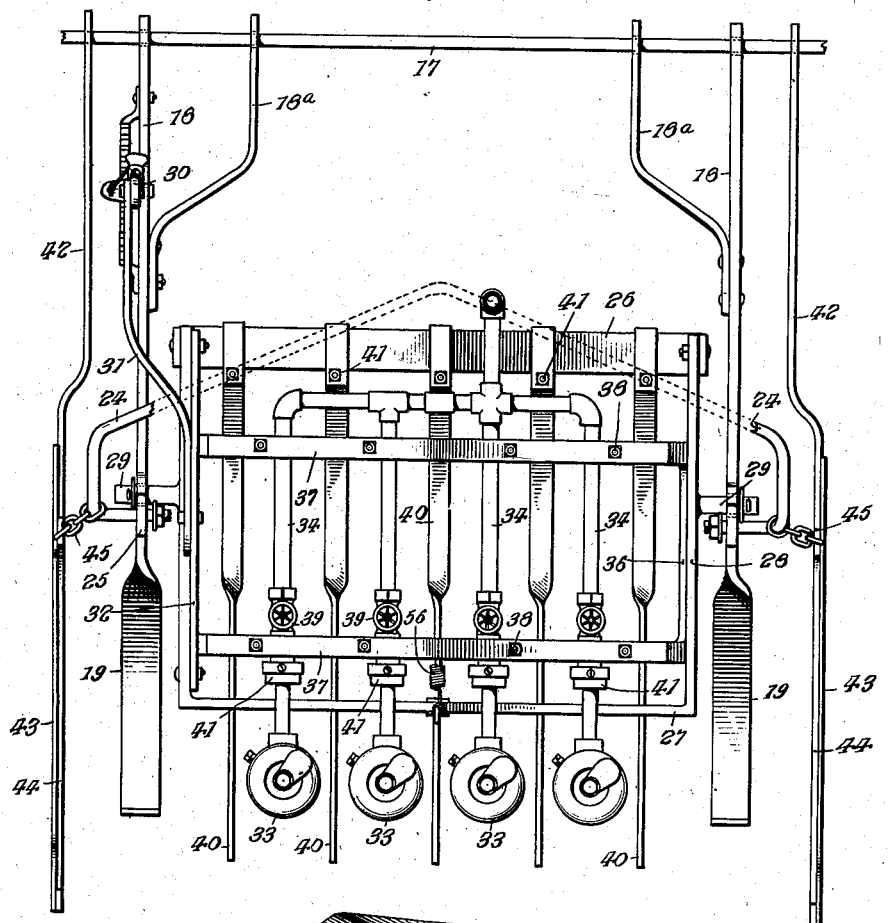
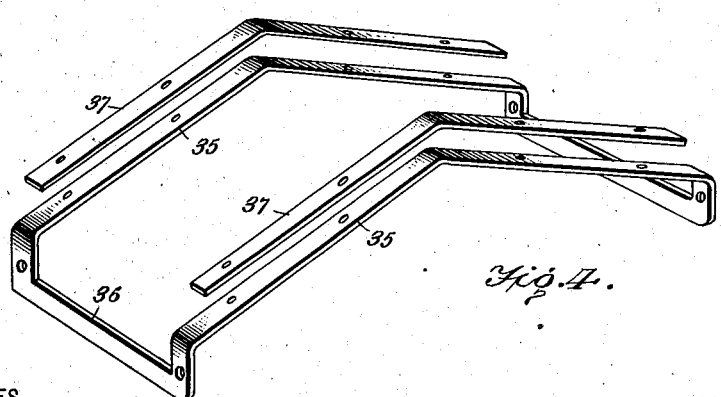
WITNESSES
INVENTOR
AUGUST ITEN,
BY
ATTORNEYS

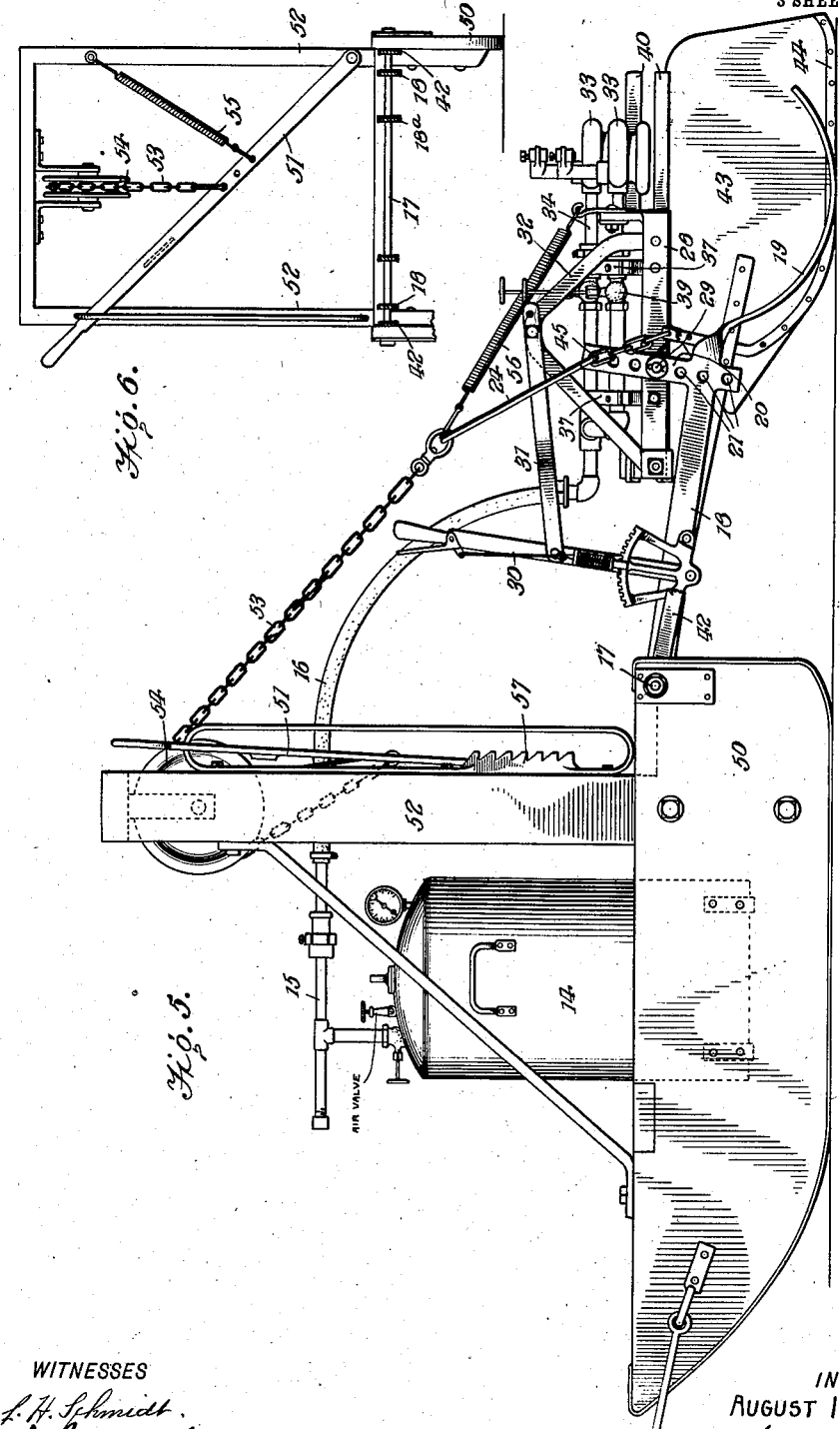

UNITED STATES PATENT OFFICE.

AUGUST ITEN, OF MOUNTAINVIEW, TERRITORY OF HAWAII.

WEED-BURNER.

No. 899,404.

Specification of Letters Patent.

Patented Sept. 22, 1908.

Application filed December 9, 1907. Serial No. 405,797.

*To all whom it may concern:*

Be it known that I, AUGUST ITEN, a citizen of the United States, residing at Mountainview, in the county of Hawaii, Territory of Hawaii, have invented a new and useful Improvement in Weed-Burners, of which the following is a specification.

This invention is an apparatus designed to destroy weeds, grass and the like by burning, the primary object being to provide an apparatus which can be used between rows of growing crops, without injury thereto, and utilizing a greater or less number of liquid fuel burners whose flames are directed downwardly to burn and destroy the weeds, together with any insects thereon, and in fact to destroy any obnoxious animal or vegetable life among the crops.

The invention is capable of attachment to the frame of an ordinary wheeled cultivator as hereinafter explained and illustrated. It may also be combined with a sled on runners, and is then particularly serviceable on steep hillsides, on rocky or very rough ground, or otherwise where a wheeled implement could not be conveniently used. The sled construction is also shown and described herein.

Among its essential features the apparatus comprises a set of burners and a frame to carry the same; guards for the burners, to prevent them from striking large rocks on the ground; shields at each side of the burners, to protect the crops; and means to raise and lower the various parts, to allow turning, to adjust the burners, and to lift the apparatus over rocks and stumps.

It may be explained, with respect to the necessity for some of the parts hereinafter described, that in certain countries, such for example as Hawaii, crops such as sugar cane are often planted in very rocky and uneven ground, and the construction of an apparatus having burners which are intended to pass close enough to the ground to burn weeds and grass must include devices for protecting the burners so that they will not be knocked off or injured by striking rocks, which are often gathered into a row or pile extending between the rows of plants.

The invention is illustrated in the accompanying drawings, in which

Figure 1 is a side elevation of the apparatus, as attached to a cultivator frame. Fig. 2 is a detail in perspective of one of the side shields. Fig. 3 is a top plan view of the apparatus. Fig. 4 is a detail in perspective of a frame which supports the burners. Fig. 5 is a side elevation of the apparatus provided with a sled. Fig. 6 is a detail in elevation of a hoisting frame and lever.

When used in connection with a cultivator frame the apparatus takes the place of the usual cultivator gangs, being attached to beams connected as usual under the wheeled frame. Such a frame is indicated at 10, the axle at 11, the wheels at 12 and the beam at 13. The tank for the kerosene or other liquid fuel is indicated at 14, carried in any convenient manner on the frame, and it is charged with sufficient air under pressure to force the liquid to the burners, through pipe 15 which is provided with proper valves and connections to permit and control the flow, including especially a flexible pipe 16 to allow the burners and frames to be raised and lowered.

A cross rod 17 is connected between the beams 13 (or between the runners when a sled is used) and this rod extends through the front ends of drag bars 18 arranged to swing up and down. The rear ends of the drag bars are twisted and bent as at 19 to run flatwise over the ground, and on rough ground, particularly, this arrangement is superior to wheels, as the drag bars will run smoother and cause less jerks and bouncing than wheels, and consequently will carry the burners steadier. Each drag bar has a vertical arm 20 with a series of holes 21, and the burner frame is supported by and between these arms. Braces 18ª prevent lateral sway of the drag bars.

The hoisting devices are also connected to these arms 20. When a cultivator frame is used, said hoisting devices are the same as known devices for cultivator beams, comprising a swinging bar 22 connected at its upper end to a swinging strut 23, and at its lower end to the arms 20 by means of an arched rod or bail 24, with inturned ends hooked in the holes in the arms. By pushing the bars 22 forward the drag bars and frame will be lifted, the hoisting action being similar to that of a cultivator provided with the same means.

A rocking frame for supporting the burners is formed by front and rear bars 26 and 27 and side bars 28. The latter have trunnions 29 extending through selected holes 21 in the arms 20; and so the frame may be raised or lowered by changing the trunnions to different holes, whereby the distance of the burners from the ground is varied. And the frame may be rocked or tilted by means of a latch lever 30, fulcrumed on one of the drag bars and connected to the frame by a link 31 and arched bar 32. By this means the burners may be swung up or down, from or to the ground, the frame rocking on the trunnions.

The burners are indicated at 33 and are arranged in a row across between the drag bars, and may be of any suitable type, having a downwardly directed nozzle or flame. Each burner is supplied with fuel by a branch pipe 34 from the pipe 16. The burners and pipes are immediately supported by a light auxiliary frame shown particularly in Fig. 4, and consisting of a lower part with cross bars 35 and end pieces 36, and of upper cross bars 37. The lower part is bolted to the side pieces 28 of the larger frame, and the pipes 34 are clamped between the bars 35 and 37 by bolts 38. As shown, the auxiliary frame is arched, to raise the middle burners to conform to the ridge of soil (or rocks referred to) between the rows. Each supply pipe has a hand valve 39 to control the flow. Swivel unions 41 enable the burners to be set at proper angles.

To protect the burners from contact with large rocks and other obstacles in the row, a series of guard bars 40 are provided. These are clamped to the front bar 26 of the frame, by means of bolts 41, the ends of the bars being bent around said front bar, and extend thence rearwardly between and below the burners, being given a quarter twist so as to not interfere with the flames. In passing over a large rock, say, the guards will ride up over the rock and so lift the burners above the same and so prevent injury thereto.

As stated, the apparatus is intended to run between rows of crops, and to protect the same side shields are provided, each of which consists of a lead bar 42 and a sheet metal plate 43. The lead bar is pivotally connected at its front end to the cross rod 17 and bolted at its rear end to the side of the shield plate, which is shaped and tapered to travel over the ground edgewise, and located beside the row of burners. A strip or shoe 44 is secured along the wearing edge of the shield, and is bent up at the front end to afford means for connection to the hoisting bail 24, by means of short chains 45. These chains allow a certain amount of independent movement of the shields, incident to rough ground or rocks, but enable the shields to be lifted with the rest of the apparatus when desired.

In Figs. 5 and 6 the sled construction is shown. The burners, frames and shields and connections are the same as above described, the hoisting devices being modified, however. The sled runners are indicated at 50, the rod 17 being connected between the rear ends thereof and the tank being carried in suitable hangers thereon. The hoisting devices comprise a lever 51 pivoted to one standard of an upright frame 52 (mounted on the runners) and connected to a chain 53 which passes over a pulley 54 on the frame and is connected to the bail 24. A spring 55 normally lifts the lever, and a spring 56 holds the chain taut on the pulley. When the lever is swung down, the burner frame etc.
will be lifted, and may be held in raised position by catching the lever in the rack 57. This sled construction will be found particularly serviceable on very rough or hilly ground, where a wheeled frame would not travel well.

The operation of the apparatus is believed to be sufficiently evident from the above description. Obviously the number of burners may be increased or decreased as desired, and various changes or modifications of the structure may be made within the scope of the invention.

The holes in the front end of the drag bars 18 and braces 18ª are preferably slightly larger than the cross rod 17, and the same is true of the holes 21 with respect to the trunnions 29. By this means the trailing frame is not rigid but will allow the drag bar 19 on either side to lift up or down in consequence of minor inequalities or stones on the ground without tilting the frame as a whole or unduly straining the same. This feature is decidedly advantageous in working on rough or stony ground.
I claim 1. The combination of drag bars beside each other, a tilting frame mounted on and between the drag bars, burners carried by the frame and arranged to direct their flames downwardly, means to supply fluid fuel to the burners, and means to tilt the frame.

2. The combination of a front frame, drag bars pivotally connected thereto and arranged to trail on the ground behind the same, a burner frame mounted on the drag bars and carrying burners directed downwardly, and hoisting devices mounted on the front frame and connected to the drag bars, to lift the same.
3. The combination of the drag bars having vertical arms, a frame pivotally mounted at its sides between the arms and vertically adjustable thereon, downwardly directed burners carried by the frame, and a lever connected to the frame for tilting the same.
4. The combination of a front cross rod having draft means, drag bars pivotally connected to the rod, a frame supported on and between the bars, burners mounted on the frame and directed downwardly, and shields on opposite sides of the burners and pivotally connected to the cross rod.

5. The combination of side bars adapted to travel over the ground, an outer frame located between the bars and supported thereby, an inner frame extending across the outer frame, fuel-supply pipes clamped upon the inner frame, and downwardly directed burners at the rear ends of the pipes.

6. The combination of a front frame, a pair of drag bars hinged thereto, a frame mounted between the drag bars, downwardly directed burners carried by the frame, shields on opposite sides of the burners and having a hinged connection to the front frame, hoisting devices mounted on the front frame and connected to the drag bars, and a flexible connection between the shields and the hoisting devices.

7. In a device of the class described, spaced drag bars, a frame having its sides pivotally connected with the drag bars, burners carried by the frame, and means for tilting the said frame.

AUGUST ITEN.

Witnesses:
T. J. RYAN,
E. L. RACKLIFF.